_United States Patent_ [11] 3,617,755

[72] Inventor Jacques A. Arnaud
 Colts Neck, N.J.
[21] Appl. No. 883,695
[22] Filed Dec. 10, 1969
[45] Patented Nov. 2, 1971
[73] Assignee Bell Telephone Laboratories Incorporated
 Murray Hill, N.J.

[54] APPARATUS FOR LOCATING AND MEASURING THE BEAM-WAIST RADIUS OF A GAUSSIAN LASER BEAM
 8 Claims, 6 Drawing Figs.

[52] U.S. Cl. .................................. 250/217,
 250/233, 356/160
[51] Int. Cl. .................................. G02f 1/28
[50] Field of Search .......................... 386/159,
 160, 124, 127, 24, 123, 157; 250/233, 232, 217, 293

[56] References Cited
 UNITED STATES PATENTS
 2,999,436 9/1961 Faulhaber .................... 250/232 X
 3,196,687 7/1965 Scalkowsky .................. 250/233 X
 3,321,630 5/1967 Durig et al. .................. 250/209
 3,436,655 4/1969 Lundgreen .................. 250/233 X
 3,418,477 12/1968 Knutrud et al. ............... 356/124 X Primary Examiner—Walter Stolwein
Attorneys—R. J. Guenther and William L. Keefauver ABSTRACT: The beam-waist and beam-waist radius of a Gaussian laser beam are electronically located and measured by selectively interrupting the laser beam at two or more parallel planes separated by a preestablished fixed distance. Pulsive signals representative of the light intensity at each of the planes of interruption are differentiated to obtain signals representative of the beam radius at the planes of interruption. A ratio of the peak amplitudes of the signals representative of the beam radii is obtained and utilized as a measure of the beam-waist radius.

PATENTED NOV 2 1971

3,617,755

INVENTOR
J. A. ARNAUD
BY
A. E. Hirsch Jr.
ATTORNEY

APPARATUS FOR LOCATING AND MEASURING THE BEAM-WAIST RADIUS OF A GAUSSIAN LASER BEAM

This invention relates to measurement systems and, more particularly, to a system for locating and measuring the beam-waist radius of a Gaussian laser beam.

BACKGROUND OF THE INVENTION

In most laser applications, it is important to know precisely the parameters of the laser beam. Such knowledge is especially vital in applications related to communication systems. For example, it is important that the laser beam parameters be within predetermined limits in order to minimize power losses in a communication system. Additionally, it is important that the parameters be within precise limits in applications involving optical cavities. That is, the laser beam must be precisely matched to the cavity in order to eliminate spurious responses. In most systems the beam parameters require periodic evaluation in order to insure that they are within predetermined limits.

One of these parameters is commonly known as the "beam-waist radius," that is, the radius of the beam at its minimum diameter or divergence point. The radius of a Gaussian laser beam is defined as the distance between the maximum power or intensity point of the beam to the point where the beam intensity is reduced by a factor of $1/e^2$ ($e=2.718...$), or approximately 0.014. Another important parameter is the position of the beam-waist along the laser beam. Additionally, the laser beam "confocal" parameter may be of interest. Once the beam-waist radius has been measured, however, the confocal parameter may be determined, provided the wavelength of the laser light is known. These parameters, namely, the beam-waist radius and its location describe completely a Gaussian laser beam.

Heretofore, the beam-waist radius and its location, and hence the confocal parameter, were determined by utilizing the so-called "pin-hole" technique. In that technique, a surface containing a pin-hole is mounted on a micromanipulator and placed in front of a photodetector. A lens of known focal length is positioned along the laser beam for focusing the beam on the photodetector. The radius of the Gaussian beam is then measured by scanning the beam with the pin-hole in a given direction to locate the maximum power point, i.e., the center of the beam. That is to say, the surface containing the pin-hole and hence the pin-hole is moved via the micromanipulator across the laser beam. Once, the point of maximum power or intensity is located, the beam is scanned until the point where the beam intensity has decreased by a factor of approximately 0.014 is located. This distance is read off the micromanipulator vernier and is the beam radius.

Use of the pin-hole measurement technique is limited to measurements of laser beams having large diameters because the diameter of the pin-hole must be very much smaller than the diameter of the laser beam being measured. Otherwise, errors result in the measurement of small diameter beams. Moreover, the pin-hole measurement technique is slow and tedious because of difficulties in locating the maximum power point via mechanical manipulation.

SUMMARY OF THE INVENTION

These and other problems are resolved in accordance with the inventive principles herein to be described in a laser beam-waist radius location and measurement system by turning to account the properties of a Gaussian laser beam.

In accordance with the invention, the beam-waist radius, and hence the corresponding diameter of a Gaussian laser beam is located and measured electronically. This is accomplished by periodically interrupting the laser beam in at least two parallel planes separated by a preestablished distance to obtain pulsive signals representative of the total power of the beam. The pulsive signals are differentiated to obtain signals which are proportional to the reciprocal of the beam radii at the planes of interruption. In accordance with the invention, the beam-waist radius of the Gaussian laser beam of known wavelength is a function of the ratio of the amplitudes of the differentiated signals representative of the beam radii at the planes at which the beam is being interrupted.

More specifically, a laser capable of emitting a Gaussian beam is positioned so that its beam is focused upon a photodetector. A chopper, for example, one having a surface with predetermined dimensions is positioned along the beam for interrupting the laser beam at two planes. The chopper is actuated at a predetermined frequency to interrupt the laser beam periodically at at least two parallel planes separated by a preestablished distance. In response to the interrupted laser beam, the photodetector generates pulsive signals representative of the power of the Gaussian laser beam at the planes of interruption. The pulsive signals are amplified and supplied to a differentiator network. The differentiator output signals are in turn supplied to a waveform indicator where a measure of their peak amplitudes is made.

The laser beam-waist is first located by moving the chopper along the beam until the differentiator output pulses for both planes of interruption are of equal peak amplitude. Then, the beam-waist is at the position midway between the two planes at which the laser beam is being interrupted. Once the beam-waist has been located, the chopper is offset from that position by a distance equal to one-half of the distance between the planes of interruption. This results in one plane of interruption being at the beam-waist position. Then, the beam-waist radius, of laser light of known wavelength, is a function of the ratio of the peak amplitudes of the output pulses from the differentiator network, representative of the radii at the two planes of interruption, and the distance separating the planes of interruption.

In certain laser applications, location of the beam-waist is unnecessary and only a measure of the beam-waist radius is desired. In such instances, a chopper which interrupts the laser beam at at least three parallel planes, each separated by a preestablished fixed distance, is utilized. This chopper is placed anywhere along the beam and need not be moved. The peak output signals developed in the differentiator network represent the beam radius at each of the planes of interruption. These signals are utilized as a measure of the beam-waist radius.

These and other objects and advantages of the invention will be more fully apprehended from the following detailed description of an illustrative embodiment thereof read in connection with the appended drawings.

DETAILED DESCRIPTION

Figure 1:
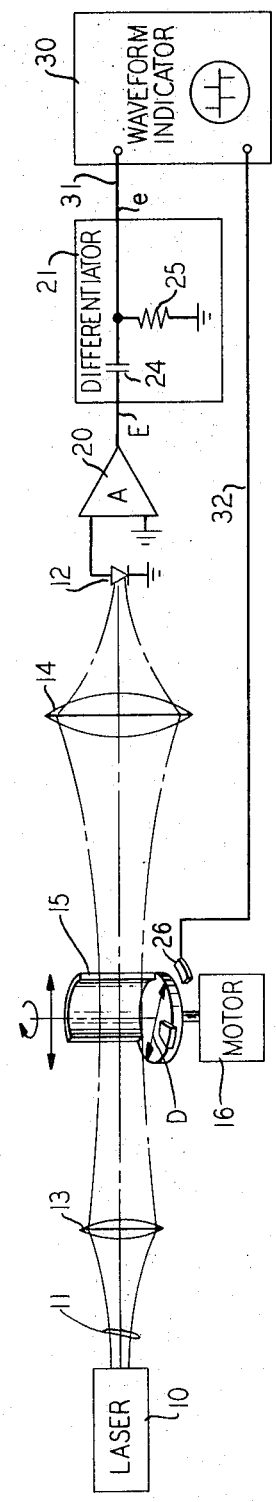
FIG. 1 depicts in simplified form a measurement system illustrating the invention.

FIG. 1 depicts in simplified form a measurement system which illustrates the principles of the invention. Shown is laser 10 which may be any of the numerous ones known in the art capable of generating a beam characterized by a Gaussian power distribution. Laser beam 11 is focused on photodetector 12 via lens 13 and lens 14. Lens 13 and lens 14 are utilized to illustrate the curvature of laser beam 11 and to focus the beam; they may be eliminated in many applications of the invention. Preferably, photodetector 12 is a silicon photocell having a receptor area which is greater than the cross sectional area of laser beam 11. Additionally, the photocell utilized for photodetector 12 should have an internal capacitance value which corresponds to the bandwidth requirements of the system.

Laser beam 11 is periodically interrupted, for example, by chopper 15 to generate pulsating signals representative of the power of laser beam 11 at two planes along the beam separated by predetermined distance D. Chopper 15 is actuated at a predetermined frequency in a well-known manner by motor 16. Preferably, chopper 15 is a disc having a curved surface, similar to a fin or a tooth, protruding orthogonal to the surface of the disc for interrupting beam 11 at the desired two planes. In practice, chopper 15 is, for example, an indented cylinder having a tooth/gap ratio equal or less than one-third. Although a single fin disc chopper is preferred, numerous other devices may be utilized to effect periodic interruption of the laser beam. For example a chopper having three teeth may be used; however, a chopper having four teeth symmetrically spaced does not effect the desired chopping. Other apparatus which may be utilized for interrupting the laser beam include tuning forks, shutters, irislike devices and the like.

In response to the interrupted laser beam, photodetector 12 generates pulsating signals which are representative of the power of laser beam 11 at the two planes of interruption. Pulsating signals E are supplied to differentiator 21 via amplifier 20. Preferably, differentiator 21 includes capacitor 24 and resistor 25. In turn, pulsive output signals $e$ developed in differentiator 21 are supplied to waveform indicator 30 via circuit path 31. Waveform indicator 30 may be, for example, an oscilloscope or other device capable of determining peak amplitudes of pulsive signals. A reference or sync signal is obtained via pickup 25 from chopper 15 and is supplied via circuit path 32 to waveform indicator 30.

I have discovered that the radius of a Gaussian laser beam is inversely proportional to the maximum rate of change of that portion of the laser beam power which is detected by photodetector 12. That is to say, the amplitude of output signals $e$ developed in differentiator 21 are inversely proportional to the beam radius at the plane at which the beam is being interrupted. Namely, that $$w = V_c \sqrt{2/\pi} \Big/ \left(\frac{dP}{dt}\right)_{max}, \qquad (1)$$

where $w$ is the beam radius at the plane of interruption, $P$ is beam power and $V_c$ is chopper velocity. The relationship of equation (1) is described in greater detail in my copending application J. A. Arnaud, Ser. No. 883,696, filed Dec. 10, 1969.

Since input signals E, supplied to differentiator 21 (FIG. 1), are representative of beam power $P$ at the planes of interruption, output signals $e$, of differentiator 21, are representative of the rate-of-change of beam power $P$, namely, $dP/dt$. Moreover, it is well known that the output of a differentiator network, for an input E, i.e., $e$, is equal to RC $dE/dt$ and $dE/dt \propto dP/dt$. Thus, equation (1) may be expressed as $$w \alpha V_c \sqrt{2/\pi}\ RC/e_{max},$$

where R and C are the resistance and capacitance values of resistor 25 and capacitor 24 (FIG. 1), respectively.

It is also known that $$w_0^2 = \frac{\lambda R}{\pi} \left[\left(\frac{w}{w_0}\right)^2 - 1\right]^{-1/2}, \qquad (3)$$

where $w_0$ is the beam-waist radius, $w$ is the beam radius at a distance R from the beam-waist position and $\lambda$ is the wavelength of the laser light. The relationship expressed in equation (3) is described in greater detail by H. Kogelnik and T. Li in an article entitled "Laser Beams and Resonantors" Applied Optics, Vol. 5, Oct. 1966.

Figure 2A:
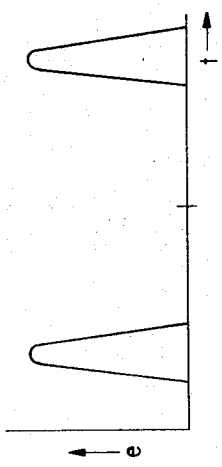
FIG. 2A shows a waveform useful in describing the operation of the invention.
Figure 2B:
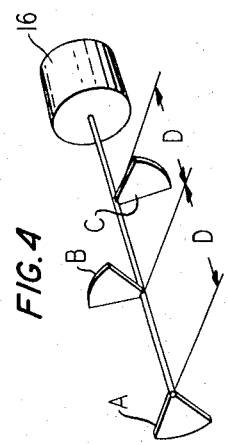
FIG. 2B shows a portion of laser beam 11 being interrupted to produce the waveform of FIG. 2A.

Thus, in practice the system shown in FIG. 1 is utilized first to locate the position of the beam-waist along laser beam 11. This is accomplished in accordance with the invention by moving chopper 15 axially along beam 11 until the output signals from differentiator 21, representative of the radii at both planes of interruption, are of equal amplitude. Preferably, chopper 15 is rotated at a velocity of approximately 30 r.p.s., although any desired velocity may be used. Use of the low velocity minimizes bandwidth requirements of the circuit components. FIG. 2A illustrates output signals $e$ from differentiator 21 (only positive portions are shown and used) for the instance of interrupting beam 11 symmetrically about the beam-waist as shown in FIG. 2B. The curvature of laser beam 11 as shown in FIG. 2B is symmetrical about the beam-waist position. Therefore, with chopper 15 positioned so that the output pulses from differentiator 21 (FIG. 1), for both planes of interruption, are of equal amplitude, as shown in FIG. 2A, the beam-waist of laser beam 11 is located at the axis of rotation 16 of chopper 15, namely, at a distance D/2 from either plane of interruption.

Figure 3A:
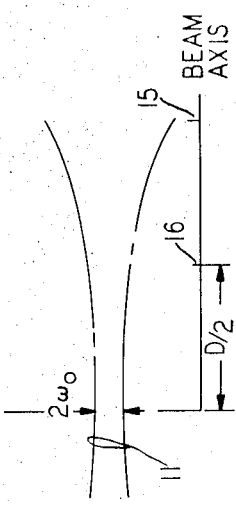
FIG. 3A shows another waveform useful in describing the invention.
Figure 3B:
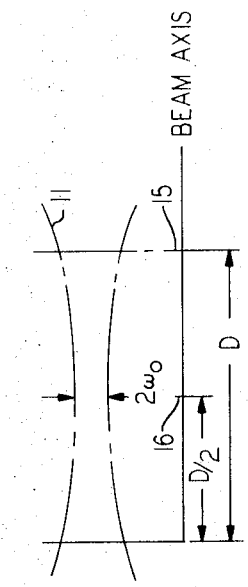
FIG. 3B shows a portion of laser beam 11 being interrupted to produce the waveform of FIG. 3A.

Once the beam-waist has been located, the beam-waist radius may be determined electronically. This is achieved in accordance with the invention by displacing chopper 15 axially along beam 11, a distance equal to D/2. That is to say, chopper 15 is positioned along laser beam 11, so that one plane of interruption is at the beam-waist position. With chopper. 15 so positioned, the peak amplitudes of output signals $e$ from differentiator 21 are measured. These signals are shown in FIG. 3A for chopper 15 positioned as shown in FIG. 3B.

Under these conditions, i.e., one plane of interruption at the beam waist, equation (2) may be expressed for each of the planes of interruption as $$w_0 = w_A \alpha\ 1/e_{A\ max}, \text{ and} \qquad (4)$$
$$w = w_B \alpha\ 1/e_{B\ max}. \qquad (5)$$

Substituting equations (4) and (5), and $D=R$ in equation (3) results in $$w_0^2 = \frac{\lambda D}{\pi} \left[\left(\frac{e_{A\ max}}{e_{B\ max}}\right)^2 - 1\right]^{-1/2}, \qquad (6)$$

and, therefore, since the wavelength $\lambda$ of the laser light and distance D between the planes of interruption are known, a measure of beam-waist radius $w_0$ is obtained directly by a measure of the ratio $e_{Amax}/e_{Bmax}$.

Figure 4:
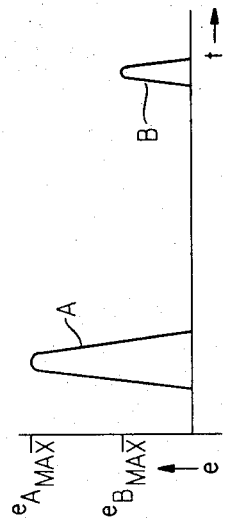
FIG. 4 shows another chopper arrangement which may be utilized in the practice of the invention.

The above described arrangements are only illustrative of the application of the principles of the invention. Numerous other arrangements may be devised by those skilled in the art without departing from the scope of the invention. For example, laser beam 11 (FIG. 1) may be interrupted at three parallel planes separated by equal predetermined distances to obtain signals representative of the beam radius at each of the planes of interruption, namely, $e_A$, $e_B$ and $e_C$. Such an arrangement as shown in FIG. 4 eliminates the need for moving chopper 15 (FIG. 1) along the beam axis to locate the beam-waist position before the beam-waist radius can be measured.

The beam-waist radius for the instance of a three plane chopper is expressed as $$w_0^2 = \frac{\lambda D}{\pi} \frac{\left\{2\left[\left(\frac{e_B}{e_A}\right)^2 + \left(\frac{e_C}{e_B}\right)^2 - 2\right] - \frac{1}{4}\left[\left(\frac{e_B}{e_A}\right)^2 - \left(\frac{e_C}{e_B}\right)^2\right]\right\}^{1/2}}{\left(\frac{e_B}{e_A}\right)^2 + \left(\frac{e_C}{e_B}\right)^2 - 2} \qquad (7)$$

where $e_A$, $e_B$ and $e_C$ are the peak amplitudes of the output signals developed in differentiator 21 representative of the beam radius at each of the planes of interruption, namely A, B and C, $\lambda$ is the wavelength of the laser light and D is the distance between each of the parallel planes of interruption.

What is claimed is:

1. Apparatus for measuring the radius of a Gaussian laser beam which comprises,
- means for periodically interrupting a laser beam at a first predetermined position orthogonal to the axis of said laser beam and at at least a second predetermined position orthogonal to the axis of said laser beam, said first and at least second positions of interruption being separated by a preestablished fixed distance,
- a photocell responsive to said interrupted laser beam for generating signals representative of the laser beam intensity at each of said positions of interruption, said photocell having a receptor area selected in accordance with the laser beam radius being measured,
- means responsive to said laser beam intensity signals generated by said photocell for generating signals representative of the radius of said laser beam at each of said positions of interruption, and
- means for obtaining a measure of a ratio of the peak amplitudes of said radii signals, said measured ratio being a measure of the radius of the said laser beam at a predetermined one of said positions of interruption.

2. Apparatus as defined in claim 1 wherein said interrupting means includes means for chopping said laser beam at three parallel planes along the axis of said laser beam, each of said parallel planes being separated by a preestablished fixed distance.

3. Apparatus as defined in claim 1 wherein said interrupting means includes a slotted cylindrical structure having an odd number of slots selectively spaced about the perimeter of said cylinder.

4. Apparatus as defined in claim 1 wherein said interrupting means includes a plurality of finlike surfaces in a predetermined spatial relationship for effecting interruption of said laser beam at said parallel positions axially along said laser beam.

5. Apparatus as defined in claim 8 wherein said means responsive to said intensity signals is a differentiator network and wherein the peak amplitudes of the output signals of said differentiator network are proportional to the inverse of the radius of said laser beam at each of said positions of interruption.

6. Apparatus for measuring the radius of a Gaussian laser beam which includes,
- chopper means for periodically interrupting a laser beam at at least two parallel planes orthogonal to the axis of said laser beam, said planes of interruption being separated by a preestablished fixed distance,
- means for selectively actuating said chopper means,
- photocell means responsive to said interrupted laser beam for generating pulsive signals, said pulsive signals being representative of the intensity of said laser beam at each of said planes of interruption,
- differentiator means responsive to said pulsive intensity signals for generating pulsive signals representative of the radius of said laser beam at each of said planes of interruption, and
- means responsive to said radii signals for obtaining a measure of a ratio of the peak amplitudes of said radii signals.

7. Apparatus as defined in claim 6 wherein said chopper means includes means having a plurality of surfaces in a preestablished spatial relationship for effecting interruption of said laser beam at said plurality of parallel planes.

8. A method for locating the beam-waist position of a Gaussian laser beam which comprises the steps of,
- interrupting a laser beam at first and second planes orthogonal to the axis of said laser beam, said first and second planes being separated by a preestablished fixed distance,
- generating signals in response to said interrupted laser beam representative of the radius of said laser beam at each of said planes of interruption, and
- moving said planes of interruption separated by said fixed distance axially along said laser beam until said signals representative of the beam radius at said first plane are equal in amplitude to the signals representative of the beam radius at said second plane of interruption.

* * * * *